(12) United States Patent
Fernandez-Mattos

(10) Patent No.: US 11,381,170 B2
(45) Date of Patent: Jul. 5, 2022

(54) POWER CONVERTER

(71) Applicant: Hamilton Sundstrand Corporation, Charlotte, NC (US)

(72) Inventor: Rodrigo Fernandez-Mattos, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/134,767

(22) Filed: Dec. 28, 2020

(65) Prior Publication Data

US 2021/0211053 A1 Jul. 8, 2021

(30) Foreign Application Priority Data

Jan. 7, 2020 (EP) .................................... 20275004

(51) Int. Cl.
| | |
|---|---|
| *H02M 3/157* | (2006.01) |
| *H02M 3/158* | (2006.01) |
| *H02M 1/14* | (2006.01) |
| *H02M 3/155* | (2006.01) |
| *H02M 1/00* | (2006.01) |

(52) U.S. Cl.
CPC ........... *H02M 3/1582* (2013.01); *H02M 1/14* (2013.01); *H02M 1/0064* (2021.05); *H02M 3/1557* (2021.05)

(58) Field of Classification Search
CPC ...... H02M 3/145; H02M 3/155; H02M 3/156; H02M 3/157; H02M 3/1582; H02M 1/14; H02M 3/1557; H02M 1/0064
See application file for complete search history.

(56) References Cited

U.S. PATENT DOCUMENTS

| | | | |
|---|---|---|---|
| 5,617,015 | A | 4/1997 | Goder et al. |
| 6,304,065 | B1 | 10/2001 | Wittenbreder |
| 7,812,577 | B2 | 10/2010 | Barthold |
| 9,148,048 | B2 | 9/2015 | Ekbote |
| 10,186,949 | B1 | 1/2019 | Ferencz et al. |
| 10,328,845 | B2 * | 6/2019 | Boudikian ............. H05B 45/10 |

(Continued)

FOREIGN PATENT DOCUMENTS

| | | |
|---|---|---|
| DE | 102017213194 A1 | 1/2019 |
| WO | 2014064643 A2 | 5/2014 |

OTHER PUBLICATIONS

European Search Report for Application No. 20275004.8, dated Jun. 29, 2020, 11 pages.

*Primary Examiner* — Adolf D Berhane
(74) *Attorney, Agent, or Firm* — Cantor Colburn LLP

(57) ABSTRACT

A power converter comprising a single-ended primary-inductor converter ("SEPIC") includes a first inductive element (L1) and a second inductive element (L2) that are arranged, in the usual way, to provide a first, non-isolated load. The power converter further includes an isolated load circuit comprising a third inductive element (L3) connected to a second output for delivery a second, isolated load. The third inductive element (L3) is coupled to the first inductive element (L1) and/or the second inductive element (L2) to transfer power to the isolated load circuit to deliver the second load, and wherein the first inductive element (L1), the second inductive element (L2) and the third inductive element (L3) are each wound around a single magnetic core.

12 Claims, 7 Drawing Sheets

(56) References Cited

U.S. PATENT DOCUMENTS

| | | | |
|---|---|---|---|
| 2009/0206657 A1* | 8/2009 | Vuk | H02J 7/345 307/9.1 |
| 2012/0281436 A1* | 11/2012 | Cuk | H02M 3/33569 363/21.03 |
| 2013/0106500 A1 | 5/2013 | Yin et al. | |
| 2014/0300343 A1* | 10/2014 | Diewald | G01R 21/00 324/103 R |
| 2017/0302176 A1* | 10/2017 | Leong | H02M 3/156 |

* cited by examiner

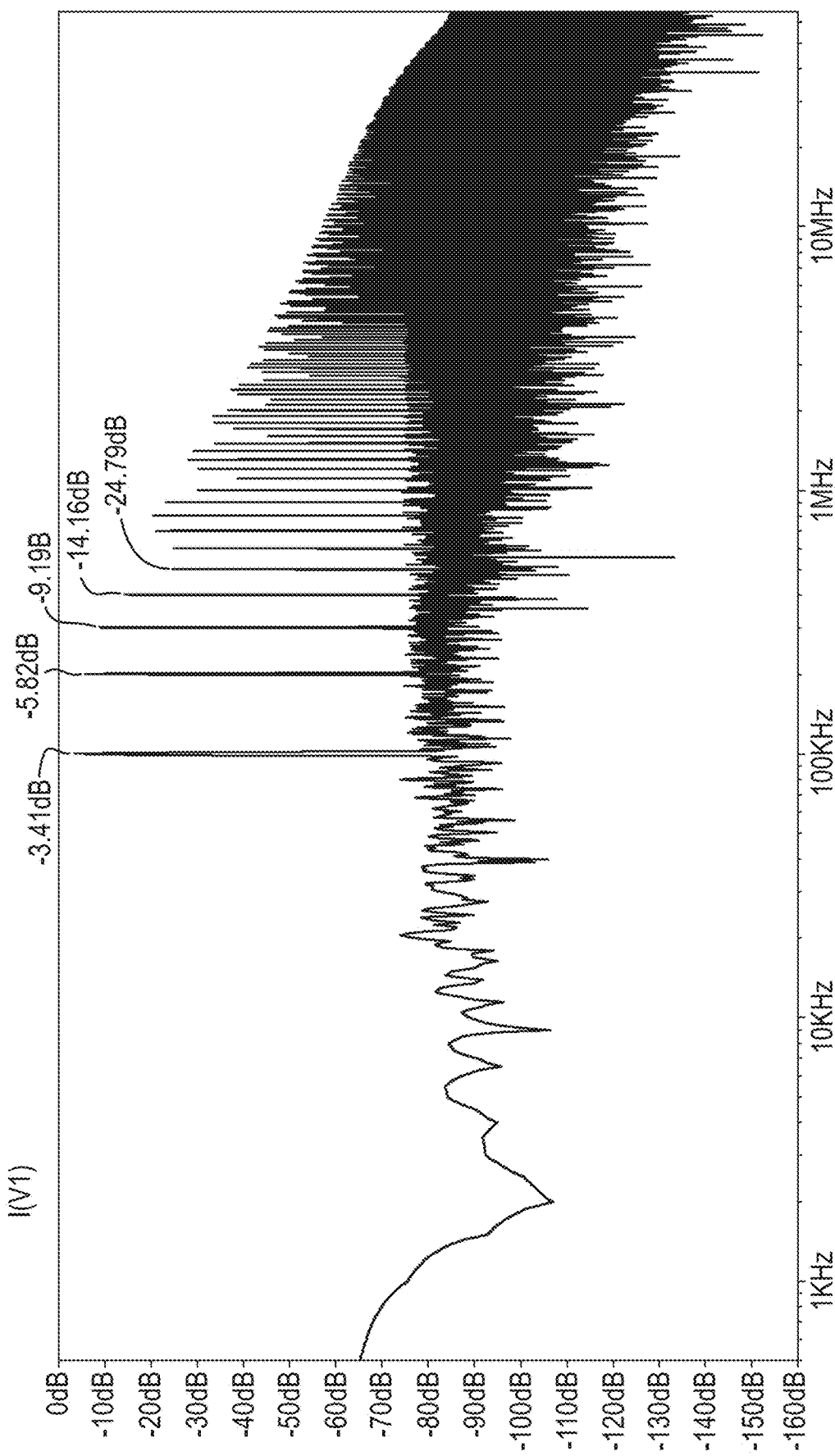

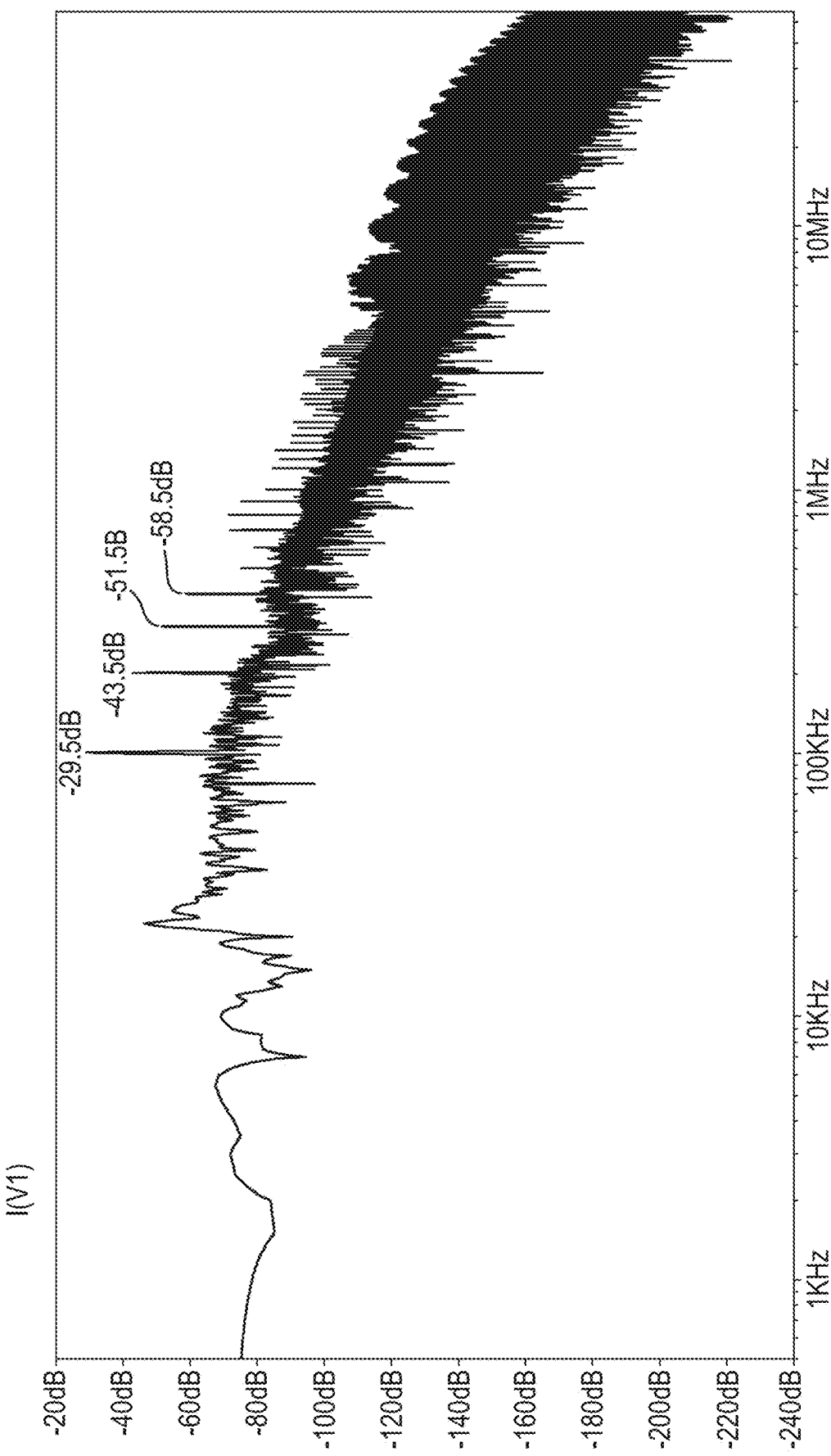

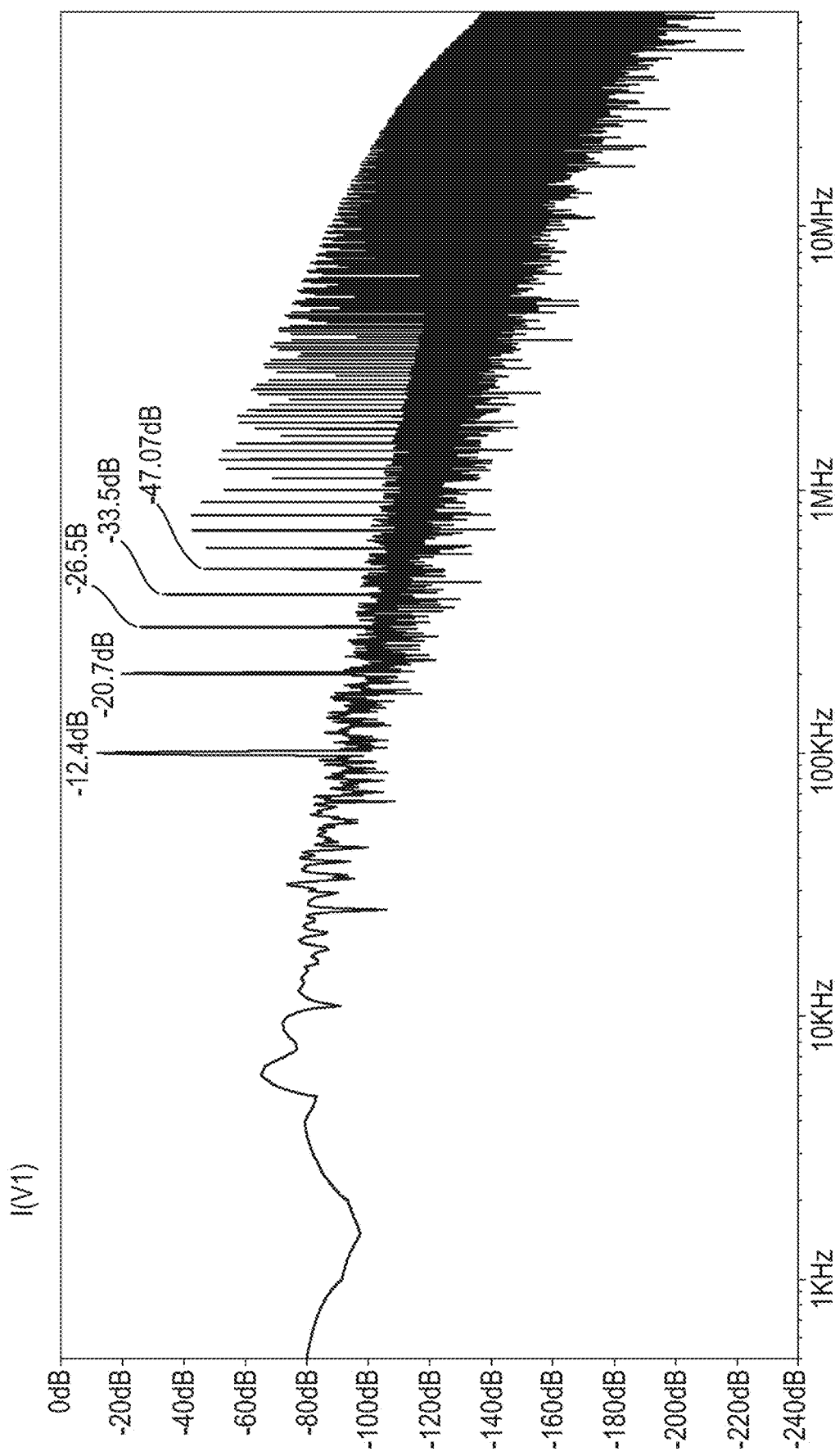

POWER CONVERTER

FOREIGN PRIORITY

This application claims priority to European Patent Application No. 20275004.8 filed Jan. 7, 2020, the entire contents of which is incorporated herein by reference.

TECHNICAL FIELD

This disclosure relates to power converters, and, in particular, their application in power supply circuits, e.g., in aircraft or automotive vehicles.

BACKGROUND

There are various electronic systems within an aircraft requiring DC power input. These systems may include electric propulsion systems, as well as environmental control systems, and so on. Typically a nominal 28 V DC supply is provided by the aircraft, which is then converted to one or more desired application voltages (which are normally much lower), in order to provide power to the various low-level electronic systems within the aircraft.

However, the input voltage range to the front-end power supply can vary, e.g. between about 18 V DC and 35 V DC in normal conditions, and with input voltages temporarily as high as about 80 V DC during overvoltage conditions. In order to maintain the desired voltage level it is therefore known to include a DC-to-DC converter stage that is capable of stepping up/down the input voltage appropriately to the desired output level.

As well as converting (stepping up/down) the input voltage appropriately to the desired level, the power supply must of course also be capable of providing the required power outputs for the different electronic systems within the aircraft. In this respect, multiple outputs may be required in order to satisfy the system need for differing load voltage requirements and loading. Furthermore, at least some of the outputs may be required to be isolated from the input and for 28 V DC fed aerospace power supplies 'Lightning Insulation' requirements dictate the use of isolated topologies.

In order to meet these requirements, it is known to use converter topologies with discontinuous input currents, e.g. 'fly-back converters' with coupled output inductors. However, the use of discontinuous input currents may give rise to unwanted interference (emissions), which can have a detrimental effect on surrounding circuitry and/or may necessitate more extensive electromagnetic shielding or filtering, e.g. to meet industry standards in terms of Radio Frequency Emissions.

Similar considerations apply for electronic systems within automotive vehicles, and other situations where it is desired to convert a DC source from one voltage level to another.

SUMMARY

A first embodiment of the technology described herein comprises a power converter comprising: a single-ended primary-inductor converter ("SEPIC"), the SEPIC including: an input for receiving an input signal; a first output for delivering a first load; a first energy storing circuit comprising a first inductive element that is connected to the input and that is connected across a switch to a first capacitive element, the first energy storing circuit arranged such that when the switch is closed, energy is stored in the first inductive element, whereas when the switch is open, energy is released from the first inductive element to charge the first capacitive element; and a second energy storing circuit comprising a second inductive element, a second capacitive element, and a first diode, wherein the first diode is connected to the first capacitive element across the second inductive element and wherein the first diode is connected to the first output across the second capacitive element, the second energy storing circuit arranged such that when the switch is closed, the first diode is reverse-biased and energy is released to the first output from the second capacitive element, whereas when the switch is open, the diode is forward-biased such that energy is released from the second inductive element to the first output and to charge the second capacitive element; the power converter further comprising: an isolated load circuit comprising a third inductive element connected to a second output for delivery of a second load, wherein the second output is isolated from the first input; wherein the third inductive element is coupled to the first inductive element and/or the second inductive element to transfer power to the isolated load circuit to deliver the second load, wherein the first inductive element, the second inductive element and the third inductive element each comprise a coil, and wherein the coils of the first inductive element, the second inductive element and the third inductive element are wound around a single magnetic core in such a manner that the third inductive element is coupled to the first inductive element and/or the second inductive element such that power can be transferred from the first inductive element and/or the second inductive element to the third inductive element in the isolated load circuit to deliver the second load.

The above arrangement, in effect, modifies the SEPIC to be able to (simultaneously) provide both isolated and non-isolated loads, whilst also in embodiments allowing the level of emissions to be reduced compared to other isolated power converter topologies. This is achieved at least in part by providing an isolated load circuit including an inductive element that is coupled to one or, in an embodiment, both of the inductive elements of the SEPIC to allow power to be transferred from the SEPIC to the isolated load circuit.

It is noted that the third inductive element may be coupled to only one of the first or second inductive elements. However, in embodiments the third inductive element is coupled to both the first and second inductive elements. This arrangement, wherein the third inductive element is coupled to the first inductive element and to the second inductive element, such that power can be transferred from the first inductive element and the second inductive element to the third inductive element in the isolated load circuit, will generally produce lower emissions.

The first energy storing circuit of the SEPIC may also include a further (fourth) inductive element that is connected in series with the first inductive element. Providing a further inductive element may help further reduce emissions that may otherwise arise due to the coupling of the third inductive element to the first and/or second inductive elements.

This further inductive element may also comprise a coil that is wound around the same single magnetic core as the first inductive element, the second inductive element and the third inductive element, but wherein the further inductive element is not magnetically coupled to any of the first inductive element, the second inductive element or the third inductive element.

For instance, in embodiments, the magnetic core comprises three branches, wherein the first inductive element, the second inductive element and the third inductive element are wound around a first branch (e.g. which may be an external branch), whereas the further inductive element is wound around a second branch (which may also be an external branch), and wherein the magnetic core is designed such that flux substantially does not flow between the first and second branches of the magnetic core.

In embodiments, a gap is provided in at least one of, and in embodiments in each of, the first and second branches of the magnetic core such that magnetic flux preferentially flows from the first and second branches of the magnetic core into a third (e.g. central) branch of the magnetic core.

The third inductive element may be wound in the opposite direction to the first inductive element and the second inductive element.

As well as the third inductive element, the isolated load circuit may comprise a further capacitive element, and a second diode, and is arranged such that when the switch is closed, the second diode is reverse-biased and the isolated output load is provided by the capacitive element, whereas when the switch is open, energy is transferred to the isolated load circuit via the third inductive element and the second diode is forward-biased such that current flows from the third inductive element to the isolated output load.

Although various embodiments have been described for ease of reference with respect to a single isolated load circuit it will be appreciated that the power converter may generally comprise a plurality of isolated load circuits each comprising a respective inductive element magnetically coupled to the first inductive element and/or the second inductive element.

The switch may comprise, for example, a MOSFET, or other suitable switching device.

Another embodiment of the technology described herein comprises a power supply comprising a power converter substantially as described above in combination with a DC voltage source, and arranged such that the DC voltage source provides the input signal to the power converter, the power converter converting the input signal to one or more output loads.

The power converter may be arranged either to step up or to step down the input signal provided by the DC voltage source to provide a substantially constant output level.

In embodiments the power supply is incorporated into an aircraft. Thus, another embodiment of the technology described herein comprises an aircraft comprising a power supply substantially as described above, wherein the output load(s) are provided to one or more electronic components or electrical systems of the aircraft.

Various other embodiments are contemplated.

DRAWINGS

Certain examples of the present disclosure will now be described with reference to the accompanying drawings, in which.

Figure 3:
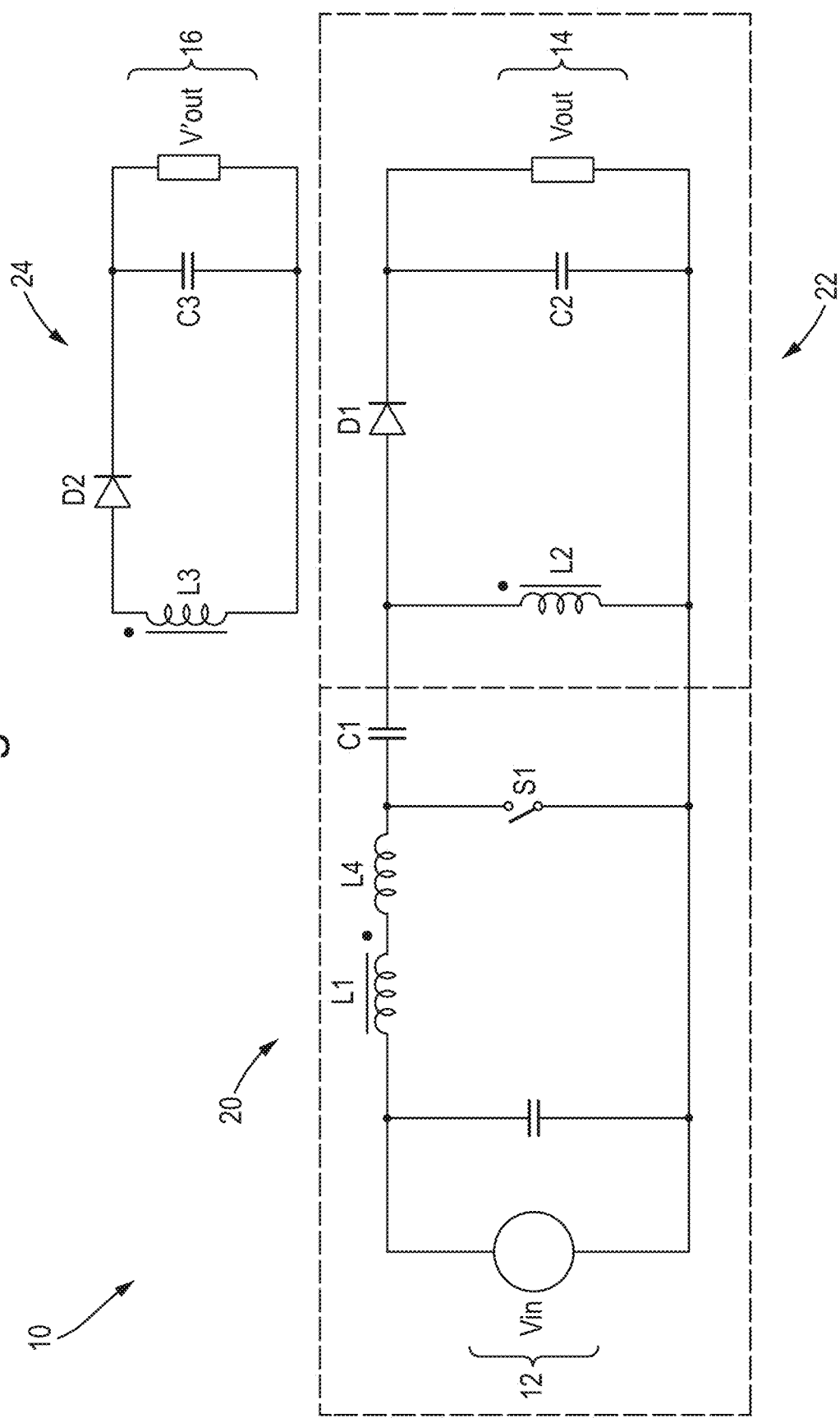
FIG. 3 shows an example of a modified SEPIC circuit according to an embodiment of the technology described herein.
Figure 5:
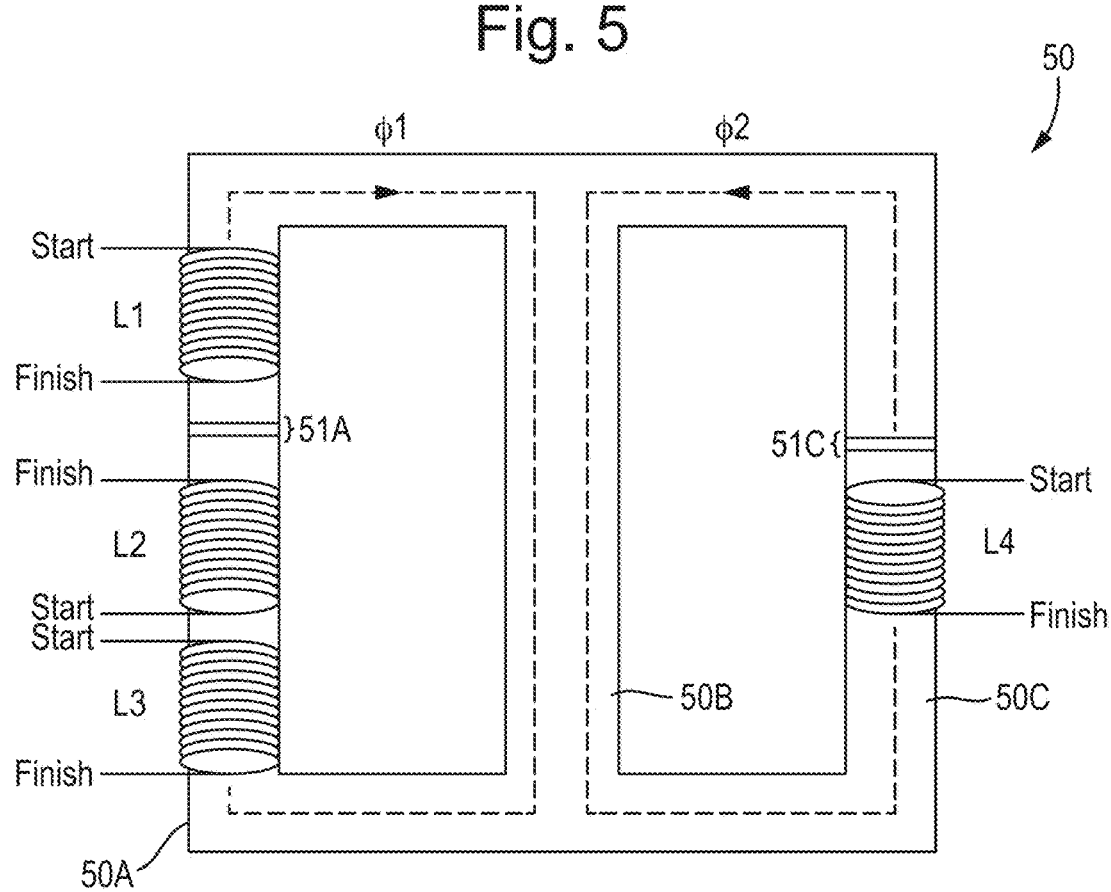
Figure 6:
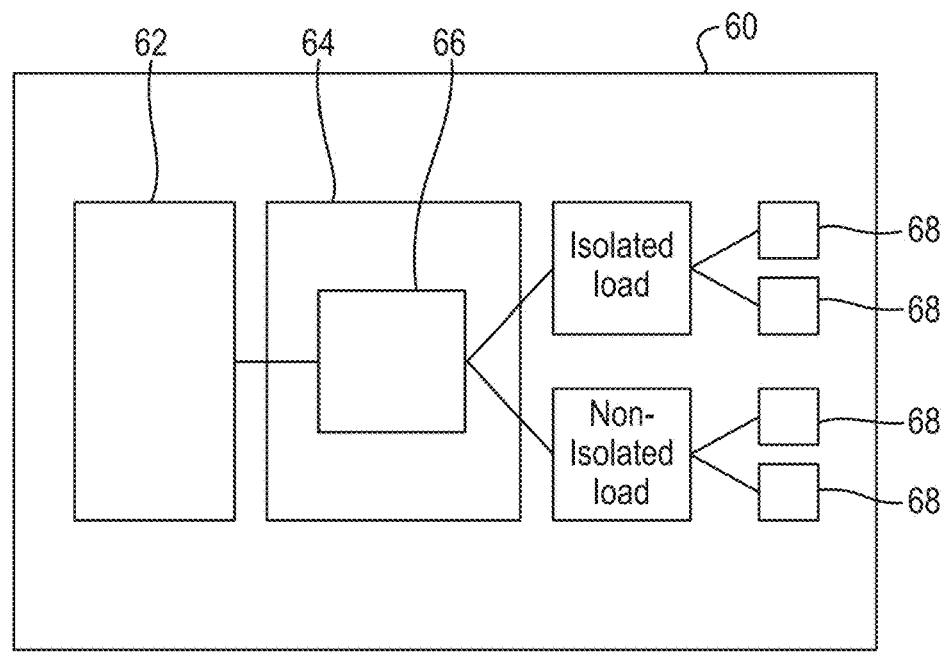

FIGS. 4A-4C illustration the reduction in harmonics achieved when using the modified SEPIC circuit without an integrated inductor (FIG. 4A) compared to the circuit according to the embodiment shown in FIG. 3 (FIG. 4B) and compared to a conventional SEPIC (FIG. 4C); and FIG. 5 shows in more detail the coil windings in the modified SEPIC circuit of FIG. 3;

FIG. 6 shows an example of an aircraft control system within which embodiments of the technology described herein may be utilised.

Like reference signs are used to denote like elements.

DETAILED DESCRIPTION

The present disclosure relates generally to power converters and particularly to power converters for use in front-end DC-DC switch mode power supplies on-board an aircraft. However, it will be appreciated that the technology described herein is not limited to such contexts and the power converters described herein may generally find utility in any application where it is desired to be able to convert power from one level to another. For example, the technology described herein may also be applied in automotive applications or even for embedded power systems, e.g. in mobile devices, or similar. In general, the technology described herein may find utility in any system where isolation and compliance with emissions (EMI) requirements may be desired.

In particular, embodiments of the technology described herein relate to a novel power converter topology that is capable of providing the ability to step up and step down the input voltage and provide both non-isolated and isolated outputs with relatively lower emissions than other traditional power converter topologies. Further, this can be achieved in a single-stage circuit with integrated magnetics to help reduce the area and weight required, which may be particularly beneficial, e.g., for aerospace applications.

Various power converter topologies exist and the selection of the appropriate power converter may depend, e.g., on the application for which it is being used. For example, for aerospace applications, it is typically desired to provide isolated loads, and to be able to both step up and step down the input voltage. At least where it is desired to use a single-stage power converter, a 'fly-back' converter is often therefore used.

Figure 1:
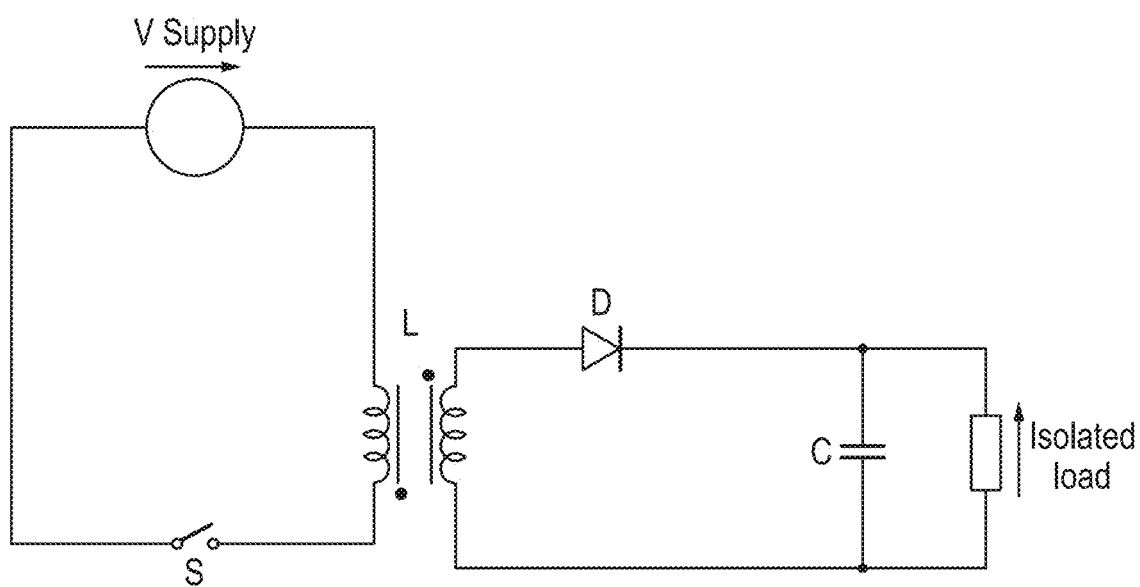
FIG. 1 shows an example of a fly-back converter.

FIG. 1 shows an example topology for a 'fly-back' converter. The fly-back converter is, in effect, a buck-boost converter with the inductor L split to form a transformer. Energy is then alternatively stored and released through the transformer by modulating a switch S. Thus, as shown in FIG. 1, the input voltage supply is connected to the primary winding of the transformer via a switch S. The secondary winding of the transformer is then connected to a diode D which is in turn connected to the output load across an output capacitor C.

When the switch S is closed, the primary winding of the transformer is thus directly connected to the input voltage supply and the current in the primary winding therefore increases such that energy is stored in the transformer. An opposite (negative) voltage is then induced in the secondary winding of the transformer, such that the diode D is reverse-biased and current cannot flow through the diode D. In this case, the output load is therefore supplied by the output capacitor C.

On the other hand, when the switch S is opened, the primary current in the transformer will decrease, and a positive voltage will then be induced in the secondary winding of the transformer. This voltage will forward-bias the diode D and thus allow current to flow from the secondary winding transformer through the diode D. The magnetic energy from the transformer is thus released to recharge the output capacitor C and to supply the output load.

A benefit of the fly-back converter topology is that, as shown in FIG. 1, the output load is isolated from the input power supply. Further, although only one isolated output load is shown in FIG. 1, it will be appreciated that multiple isolated output circuits can be provided in a similar fashion. For this reason, as mentioned above, fly-back converters are often found in power supplies for aircraft electronics systems, as they can provide the desired voltage control and isolation within a single-stage circuit.

However, the fly-back converter in FIG. 1 draws a pulsating input current which can lead to high levels of emissions. In order to meet the required industry standards in that respect, it is known therefore to place significant effort on providing electromagnetic interference (EMI) filters to suppress any such electromagnetic interference on the power supply.

Embodiments of the present disclosure thus relate to novel power converters that are suitable for use in aerospace (and other) applications but that address at least some of the drawbacks of known fly-back converters. In particular, embodiments of the present disclosure provide a power converter that is capable of providing an isolated output with reduced emission levels. The power converter in embodiments is based on a modified "single-ended primary-inductor converter" (SEPIC) circuit.

Figure 2:
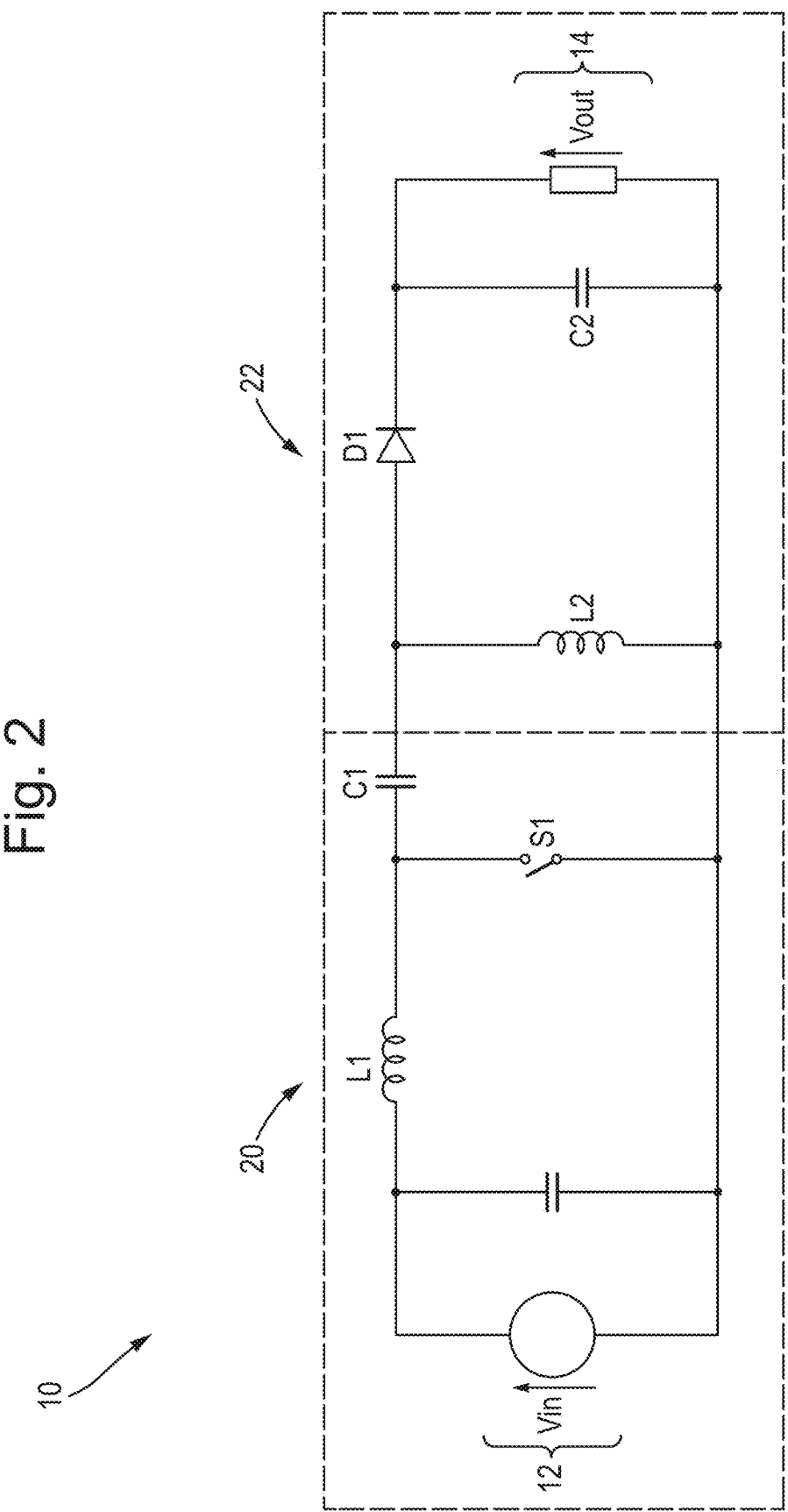
FIG. 2 shows an example of a single-ended primary-inductor converter ("SEPIC")

An example of a more traditional SEPIC circuit is shown in FIG. 2 and essentially comprises a boost converter followed by an inverted buck-boost converter. The SEPIC is therefore similar to a buck-boost converter, except that the output is non-inverted. The SEPIC thus allows the input voltage to be stepped up or down, as desired, by suitable modulation of a switch, which is typically a transistor such as a MOSFET.

As shown in FIG. 2, the SEPIC circuit 10 can be divided conceptually into two energy storing circuits. The first energy storing circuit 20 includes an input 12 for receiving the input voltage supply Vin, a first inductive element L1 and a first capacitive element C1 connected to the first inductive element L1 across the switch S1. The first capacitive element C1 is connected to a diode D1 of the second energy storing circuit 22 across a second inductive element L2 with the diode D1 in turn being connected across a second capacitive element C2 to the output 14 for delivering the output load Vout.

When the switch S1 is closed, current can flow from the input voltage supply Vin into the first inductive element L1, and the energy stored in the first inductive element L1 therefore increases. The voltage across the first capacitive element C1 is always equal to the input voltage Vin. The diode D1 is therefore reverse-biased so that current cannot flow through the diode D1. Energy is therefore released from the first capacitive element C1 (the coupling capacitor) and stored in the second inductive element L2. The output load Vout is thus provided by discharge of the second capacitive element C2 (the output capacitor).

When the switch S1 is opened current flows from the first inductive element L1 to the first capacitive element Cl. The diode D1 is now forward-biased and current therefore flows from the first capacitive element C1 and from the second inductive element L2 to the load Vout (and also to charge the second capacitive element C2).

It will be appreciated that the boost/buck capabilities of the SEPIC are possible because of the first capacitive element C1 and the second inductive element L2. For instance, the first inductive element L1 and the switch S1 create a standard boost converter, which generates a voltage that is higher than the input voltage Vin, and the magnitude of which is determined by the duty cycle of the switch S1. As mentioned above, the average voltage at the first capacitive element C1 is equal to the input voltage Vin. The load is therefore given by the difference between the voltage generated by the first energy storing circuit 20 and the input voltage Vin. Thus, if the voltage generated by the first energy storing circuit 20 is less than double the input voltage Vin, the output voltage Vout will be less than the input voltage Vin, whereas if this voltage is greater than double the input voltage Vin, the output voltage Vout will be greater than the input voltage Vin.

A capacitor may also be provided at the input connected across the input power supply, as shown in FIG. 2. This has no effect on the analysis above but serves to reduce the effects of parasitic inductance and internal resistance in the power supply itself.

A benefit of the SEPIC circuit in FIG. 2 is that it does not need to draw a pulsating input current. However, this topology is not commonly used in aircraft power supplies due to the lack of isolation.

An embodiment will now be described with reference to FIG. 3. In FIG. 3, an extra winding is coupled to both of the SEPIC inductors L1, L2 in order to modify the SEPIC converter to provide a second output 16 capable of delivering an isolated output load V'out. As will be explained further below, the third inductive element L3 is in an embodiment coupled to the first inductive element L1 and the second inductive element L2 by having each inductive element share the same magnetic core. The power converter is based on a modified SEPIC topology and the operation and layout of the SEPIC circuit is therefore essentially the same as described above in relation to FIG. 2.

Thus, in the same manner described above, when the switch S1 is closed, the current in L1 will increase, thereby storing energy from the input supply Vin in the first inductive element L1. The current in L2 also increases storing energy from coupling capacitor C1 (since the voltage in this capacitor is always equal to the input voltage Vin). Power to the load is supplied by the output capacitor C2 as the rectifying diode is reverse-biased when the switch S1 is closed.

On the other hand, when the switch S1 is open, the first inductive element L1 charges the capacitor C1 and provides current to the non-isolated output 14 to deliver a first, non-isolated output load Vout. The output inductor L2 is also connected to the load during this time.

There are two main differences in the modified SEPIC circuit according to the embodiment of FIG. 3 compared to the traditional SEPIC circuit shown in FIG. 2.

Firstly, in order to provide an isolated load V'out, the first inductive element L1 and the second inductive element L2 of the SEPIC circuit are magnetically coupled to a third inductive element L3 forming part of an isolated load circuit 24 having a second, isolated output 16. Energy can therefore be transferred through this coupling from both the first inductive element L1 and the second inductive element L2 to the isolated load circuit to deliver the second, isolated output V'out, in a generally similar fashion as described above in relation to the fly-back converter of FIG. 1.

In the isolated load circuit 24 the third inductive element L3 is connected to a diode D2 which is turn connected across an output capacitor C3 to the load V'out, again similarly to the isolated load circuit of the fly-back converter in FIG. 1.

In this way, by coupling the third inductive element L3 to the inductive elements L1, L2 of the SEPIC, part of the energy that is stored in the SEPIC circuit when the switch S1 is closed can then be (and is) transferred ('flies') to the third inductive element L3 by opening the switch S1. In the circuit shown the coil winding of the third inductive element L3 is wound in the opposite direction to the coil windings of the first and second inductive elements L1, L2. This means that the diode D2 of the isolated load circuit 24 is reverse-biased when the switch is closed, such that the isolated load V'out is provided by the output capacitor C3 of the isolated load circuit 24 in that state. However, other arrangements would of course be possible.

The modified SEPIC circuit shown in FIG. 3 thus allows both isolated and non-isolated loads to be provided with the voltage levels being able to be stepped up or down, as desired. However, the addition of the isolated load circuit 24 introduces a pulsating input current (that would not be present in a traditional SEPIC circuit) and may lead to undesirable emissions.

To reduce this, a fourth inductive element L4 is connected in series with the first inductive element L1, as shown in FIG. 3. The fourth inductive element L4 is however not coupled to any of the other inductive elements. The fourth inductive element L4 thus forms a low pass filter with the first capacitive element C1 resulting in a significant reduction in the harmonic content (and hence the level of emissions), as illustrated in FIGS. 4A-4C which respectively show the levels (in dB) of emissions at frequencies from 1 kHz to greater than 10 MHz for a circuit like that shown in FIG. 3 but without the additional fourth inductive element L4 (FIG. 4A); the fly-SEPIC circuit shown in FIG. 3 (FIG. 4B), and a traditional SEPIC circuit like that shown in FIG. 2 (FIG. 4C). Note that these results were all obtained without any electromagnetic interference filtering. It can be seen that adding the fourth inductive element L4 results in a significant reduction in the harmonic content and hence the levels of emissions.

Rather than adding the fourth inductive element L4 as an extra component, or relying on leakage inductance from the first inductive element L1, the fourth inductive element L4 is in embodiments also integrated with the first inductive element L1, the second inductive element L2 and the third inductive element L3 onto a single magnetic core, as shown in FIG. 5.

For instance, it will be appreciated that there may also be inductive leakage in this region. However, providing a dedicated fourth inductive element L4 that is not coupled to the other inductive elements provides an enhanced control of harmonics and inductance since the inductance of the fourth inductive element L4 is a design parameter that can be optimised. Furthermore, integrating all of the inductive elements onto the same magnetic core helps to reduce the overall area and weight of the device which is particularly beneficial for aerospace applications.

Each of the inductive elements described above thus comprises a coil winding that in embodiments is wound around the same (single) magnetic core 50. It will be appreciated that the coil windings need not be manually wound around the magnetic core and may be formed in any suitable manner, e.g. printed, so as to be functionally wound around the magnetic core, and in embodiments this may be done. As discussed above, the third inductive element L3 is coupled to the first inductive element L1 and the second inductive element L2, and so these may readily be wound around the same magnetic core to provide the desired coupling. However, the magnetic core is shaped and the coil windings arranged to substantially prevent the fourth inductive element L4 from coupling with the other inductive elements L1, L2 and L3.

In particular, as shown in FIG. 5, in an embodiment, a three-branch magnetic core is used, with each set of inductors placed on the external branches of the core 50A, 50C. Thus, the first inductive element L1, the second inductive element L2, and the third inductive element L3 are all wound around a first external branch of the core 50A, whereas the fourth inductive element L4 is wound around the other external branch of the core 50C. Further, a gap 51A, 51C is placed in each respective external branch 50A, 50C, whilst leaving the middle branch 50B un-gapped. This means that the coupling between the fourth inductive element L4 and the other inductive elements is limited since the middle branch 50B presents a lower reluctance path than the other external path. This effect is illustrated in FIG. 5 which shows how magnetic flux will flow around the magnetic core 50.

FIG. 6 shows schematically an aircraft electronics system comprising an aircraft power supply 62 that supplies input voltage to a power supply circuit 64 including a power converter 66 of the type described above. The regulated isolated and non-isolated outputs from the power supply circuit 62 are then provided as output to various electronic components 68 on-board the aircraft 60 in the usual way.

Although the present disclosure has been described with reference to various embodiments, it will be understood by those skilled in the art that various changes in form and detail may be made without departing from the scope of the invention as set forth in the accompanying claims.

The invention claimed is:

1. A power converter comprising:
a single-ended primary-inductor converter ("SEPIC"), the SEPIC including:
an input for receiving an input signal ($V_{in}$);
a first output for delivering a first load ($V_{out}$);
a first energy storing circuit comprising a first inductive element (L1) that is connected to the input ($V_{in}$) and that is connected across a switch (S1) to a first capacitive element (C1),
the first energy storing circuit arranged such that when the switch (S1) is closed, energy is stored in the first inductive element (L1), whereas when the switch (S1) is open, energy is released from the first inductive element (L1) to charge the first capacitive element (C1); and
a second energy storing circuit comprising a second inductive element (L2), a second capacitive element (C2), and a first diode (D1), wherein the first diode (D1) is connected to the first capacitive element (C1) across the second inductive element (L2) and wherein the first diode (D1) is connected to the first output across the second capacitive element (C2),
the second energy storing circuit arranged such that when the switch (S1) is closed, the first diode (D1) is reverse-biased and energy is released to the first output from the second capacitive element (C2), whereas when the switch (S1) is open, the diode is forward-biased (D1) such that energy is released from the second inductive element (L2) to the first output and to charge the second capacitive element (C2);
the power converter further comprising:
an isolated load circuit comprising a third inductive element (L3) connected to a second output for delivery of a second load ($V'_{out}$), wherein the second output (16) is isolated from the first input;
wherein the third inductive element (L3) is coupled to the first inductive element (L1) and/or the second inductive element (L2) to transfer power to the isolated load circuit to deliver the second load (V'$_{out}$), wherein the first inductive element (L1), the second inductive element (L2) and the third inductive element (L3) each comprise a coil, and wherein the coils of the first inductive element (L1), the second inductive element (L2) and the third inductive element (L3) are wound around a single magnetic core in such a manner that the third inductive element (L3) is coupled to the first inductive element (L1) and the second inductive element (L2) such that power can be transferred from the first inductive element (L1) or the second inductive element (L2) to the third inductive element (L3) in the isolated load circuit to deliver the second load (V'$_{out}$).

2. The power converter of claim 1, wherein the first energy storing circuit of the SEPIC includes a further inductive element (L4) that is connected in series with the first inductive element (L1).

3. The power converter of claim 1, wherein the third inductive element (L3) is wound in the opposite direction to the first inductive element (L1) and the second inductive element (L2).

4. The power converter of claim 1, comprising a plurality of isolated load circuits each comprising a respective inductive element (L3) that is magnetically coupled to the first inductive element (L1) and/or the second inductive element (L2) of the SEPIC.

5. The power converter of claim 1, wherein the switch (S1) comprises a MOSFET.

6. A power supply comprising:
a power converter as claimed in claim 1; and
a DC voltage source,
wherein the power converter is arranged such that the DC voltage source provides the input signal (V$_{in}$) to the power converter, the power converter converting the input signal (V$_{in}$) to one or more output loads (V$_{out}$, V'$_{out}$).

7. The power supply of claim 6, wherein the power converter is arranged either to step up or to step down the input signal provided by the DC voltage source to provide a substantially constant output level.

8. An aircraft comprising a power supply as claimed in claim 6, wherein the output load(s) are provided to one or more electronic components or electrical systems of the aircraft.

9. A power converter comprising:
a single-ended primary-inductor converter ("SEPIC"), the SEPIC including:
an input for receiving an input signal (V$_{in}$);
a first output for delivering a first load (V$_{out}$);
a first energy storing circuit comprising a first inductive element (L1) that is connected to the input (V$_{in}$) and that is connected across a switch (S1) to a first capacitive element (C1),
the first energy storing circuit arranged such that when the switch (S1) is closed, energy is stored in the first inductive element (L1), whereas when the switch (S1) is open, energy is released from the first inductive element (L1) to charge the first capacitive element (C1); and
a second energy storing circuit comprising a second inductive element (L2), a second capacitive element (C2), and a first diode (D1), wherein the first diode (D1) is connected to the first capacitive element (C1) across the second inductive element (L2) and wherein the first diode (D1) is connected to the first output (14) across the second capacitive element (C2), the second energy storing circuit arranged such that when the switch (S1) is closed, the first diode (D1) is reverse-biased and energy is released to the first output from the second capacitive element (C2), whereas when the switch (S1) is open, the diode is forward-biased (D1) such that energy is released from the second inductive element (L2) to the first output (14) and to charge the second capacitive element (C2);

the power converter further comprising:
an isolated load circuit comprising a third inductive element (L3) connected to a second output for delivery of a second load (V'$_{out}$), wherein the second output is isolated from the first input;
wherein the third inductive element (L3) is coupled to the first inductive element (L1) and/or the second inductive element (L2) to transfer power to the isolated load circuit to deliver the second load (V'$_{out}$),
wherein the first inductive element (L1), the second inductive element (L2) and the third inductive element (L3) each comprise a coil, and wherein the coils of the first inductive element (L1), the second inductive element (L2) and the third inductive element (L3) are wound around a single magnetic core in such a manner that the third inductive element (L3) is coupled to the first inductive element (L1) and/or the second inductive element (L2) such that power can be transferred from the first inductive element (L1) and/or the second inductive element (L2) to the third inductive element (L3) in the isolated load circuit to deliver the second load (V'$_{out}$);
wherein the first energy storing circuit of the SEPIC includes a further inductive element (L4) that is connected in series with the first inductive element (L1);
wherein the further inductive element (L4) comprises a coil that is wound around the same single magnetic core as the first inductive element (L1), the second inductive element (L2) and the third inductive element (L3), but wherein the further inductive element (L4) is not magnetically coupled to any of the first inductive element (L1), the second inductive element (L2) or the third inductive element (L3).

10. The power converter of claim 9, wherein the magnetic core comprises three branches, and wherein the first inductive element (L1), the second inductive element (L2) and the third inductive element (L3) are wound around a first branch, whereas the further inductive element (L4) is wound around a second branch, and wherein the magnetic core is designed such that flux substantially does not flow between the first and second branches of the magnetic core.

11. The power converter of claim 10, wherein a gap is provided in at least one of the first and second branches of the magnetic core such that magnetic flux preferentially flows from the first and second branches of the magnetic core into a third branch of the magnetic core.

12. A power converter comprising:
a single-ended primary-inductor converter ("SEPIC"), the SEPIC including:
an input for receiving an input signal (V$_{in}$);
a first output for delivering a first load (V$_{out}$);
a first energy storing circuit comprising a first inductive element (L1) that is connected to the input (V$_{in}$) and that is connected across a switch (S1) to a first capacitive element (C1),
the first energy storing circuit arranged such that when the switch (S1) is closed, energy is stored in the first inductive element (L1), whereas when the switch (S1)

is open, energy is released from the first inductive element (L1) to charge the first capacitive element (C1); and a second energy storing circuit comprising a second inductive element (L2), a second capacitive element (C2), and a first diode (D1), wherein the first diode (D1) is connected to the first capacitive element (C1) across the second inductive element (L2) and wherein the first diode (D1) is connected to the first output across the second capacitive element (C2), the second energy storing circuit arranged such that when the switch (S1) is closed, the first diode (D1) is reverse-biased and energy is released to the first output from the second capacitive element (C2), whereas when the switch (S1) is open, the diode is forward-biased (D1) such that energy is released from the second inductive element (L2) to the first output and to charge the second capacitive element (C2);

the power converter further comprising:

an isolated load circuit comprising a third inductive element (L3) connected to a second output for delivery of a second load ($V'_{out}$), wherein the second output (16) is isolated from the first input;

wherein the third inductive element (L3) is coupled to the first inductive element (L1) and/or the second inductive element (L2) to transfer power to the isolated load circuit to deliver the second load ($V'_{out}$), wherein the first inductive element (L1), the second inductive element (L2) and the third inductive element (L3) each comprise a coil, and wherein the coils of the first inductive element (L1), the second inductive element (L2) and the third inductive element (L3) are wound around a single magnetic core in such a manner that the third inductive element (L3) is coupled to the first inductive element (L1) and/or the second inductive element (L2) such that power can be transferred from the first inductive element (L1) or the second inductive element (L2) to the third inductive element (L3) in the isolated load circuit to deliver the second load ($V'_{out}$);

wherein the isolated load circuit comprises:

the third inductive element (L3), a further capacitive element (C3), and a second diode (D2), wherein the circuit is arranged such that when the switch (S1) is closed, the second diode (D2) is reverse-biased and the isolated, second output load ($V'_{out}$) is provided by the capacitive element (C3), whereas when the switch (S1) is open, energy is transferred to the isolated load circuit via the third inductive element (L3) and the second diode is forward-biased such that current flows from the third inductive element (L3) to provide the second output load ($V'_{out}$).

* * * * *